United States Patent Office 3,480,037
Patented Nov. 25, 1969

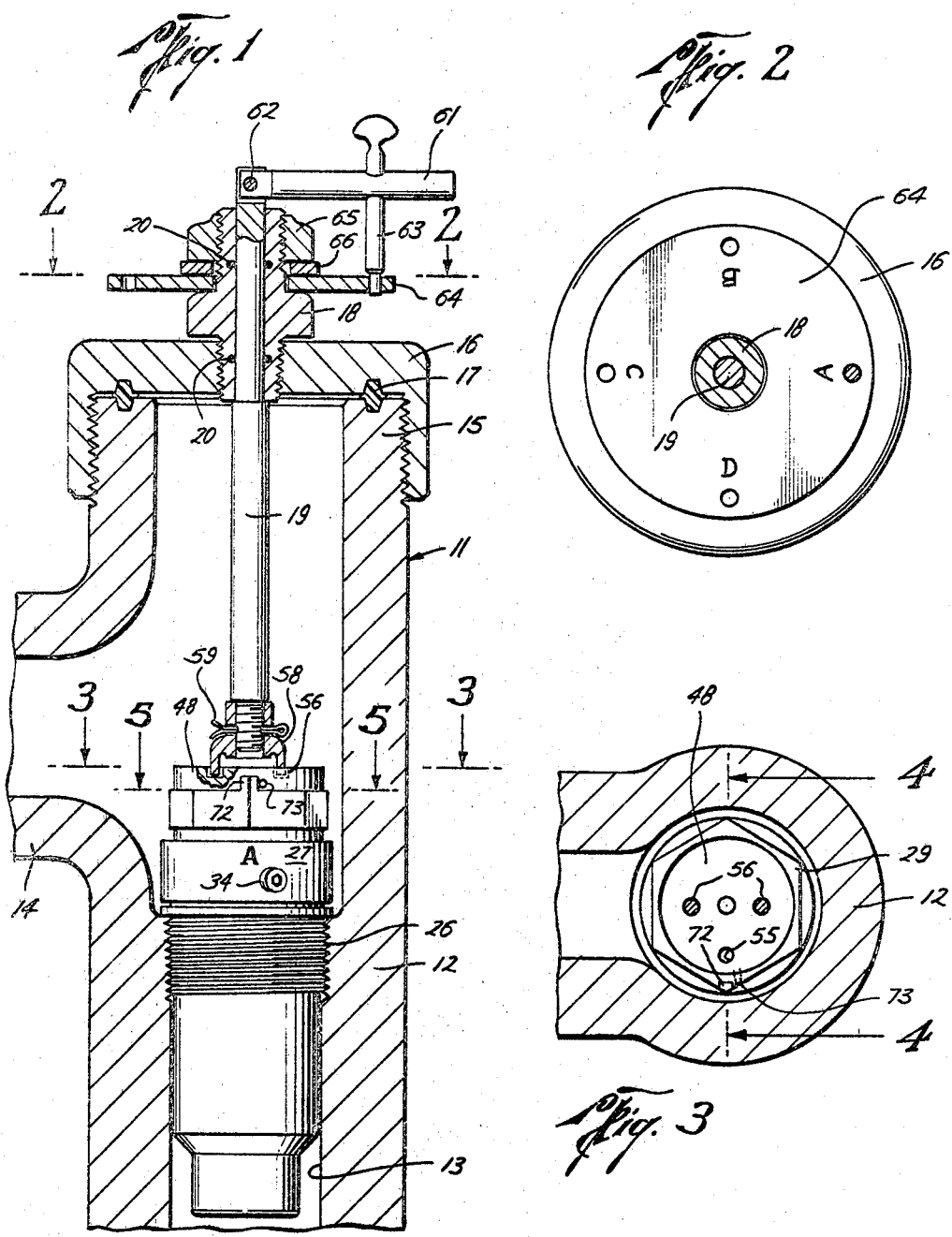

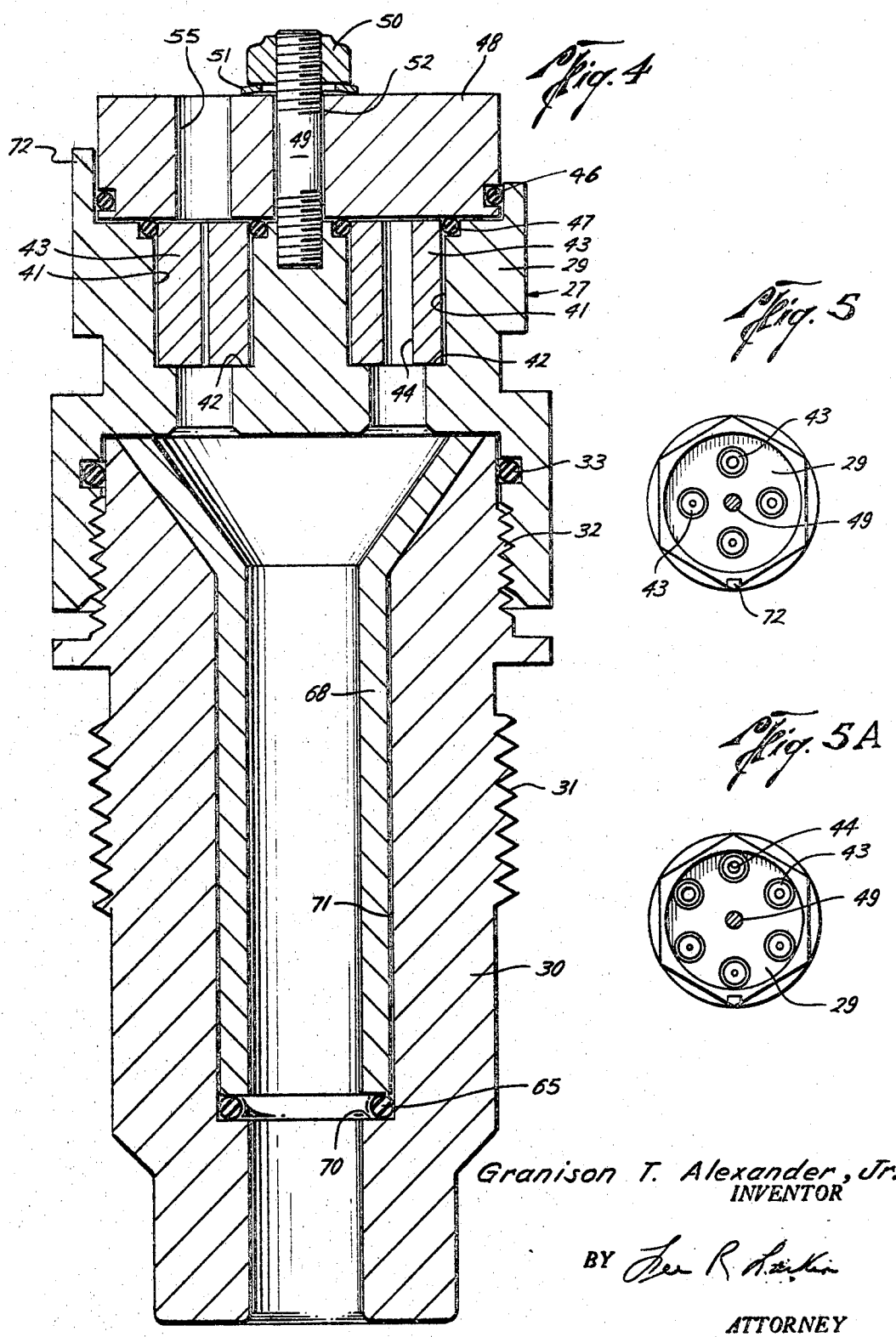

3,480,037
ADJUSTABLE POSITIVE CHOKE
Granison T. Alexander, Jr., Houma, La., assignor to Gem Oil Tool Company, Inc., Houma, La., a corporation of Louisiana
Filed Oct. 6, 1967, Ser. No. 673,498
Int. Cl. F16k 5/10, 43/00; E21b 43/12
U.S. Cl. 137—329.06
11 Claims

ABSTRACT OF THE DISCLOSURE

An adjustable positive choke for controlling fluid flow through a conduit. It is particularly useful as a wellhead valve for controlling the flow of fluid from an oil well, for example. The choke includes a plurality of flow bean inserts having axial bores therethrough which may be of the same cross sectional area or different cross sectional areas whereby fluid flow through the choke may be selectively controlled through each of the flow bean inserts, thereby providing an adjustable choke, which choke has a positive size orifice in each flow position.

---

This invention relates to an adjustable positive choke for controlling fluid flow through a fluid conduit. It is particularly adaptable and useful in connection with the oil well installations where it is desirable to control the rate of fluid flow through a fluid conduit connected to a wellhead, for example.

This invention may be considered an improvement on the types of valves shown in U.S. Patent Nos. 2,219,504 and 3,207,181. One of the problems encountered with valves of this general type is that the fluid passing through the choke may contain highly abrasive or corrosive substances such as sand, which tend to abrade or corrode away a portion of the flow bean, to thereby adversely affect the control of the amount of fluid passing therethrough. Moreover, this abrasive or corrosive material renders it difficult to provide appropriate sealing means for controlling the fluid flow therethrough without damage to related parts thereof.

Other flow controlling devices have been used for providing an adjustable choke, which devices are in the form of a needle valve. However, these types of chokes are generally referred to as the non-positive type of chokes for the reason that it is difficult to control the exact size of the orifice openings through which the fluid flow is being directed. Moreover, the abrasive or corrosive wear on the needle valve and associated parts causes these types of valves to reflect improper choke size openings in various positions, thereby rendering it difficult to exactly control the size of the choke opening.

It is also desirable to have an adjustable positive type choke which can be readily adaptable to the standard choke bodies presently in existance in the field, and which is so designed and constructed that the flow bean inserts may be readily changed with a minimum of effort. In some instances, it is desirable to have a plurality of flow beans having different size orifices such that the flow rate can be varied by directing passage of the fluid flow through different choke openings. In other instances, it is desirable to have a choke arranged such that once a particular choke aperture has become worn, fluid flow can readily be switched through another flow bean having an aperture of the same size.

It is, therefore, an object of this invention to provide an improved adjustable positive choke valve for controlling fluid flow therethrough, which choke solves the foregoing problems, which is readily adaptable to existing choke bodies presently in use in the field, and which can be installed and serviced with a minimum of time and materials.

Briefly stated, the present invention includes a housing having a longitudinally extending opening therethrough, with the housing including inlet and outlet means leading to and from the opening. It also includes a flow bean body fixedly mounted in fluid-flow blocking relationship in the opening and having a plurality of longitudinal passages therethrough, with each of the passages communicating with the inlet and outlet means, and each of the passages being provided with shoulder means.

Each of the passages has a fluid flow controlling insert removably mounted in abutting relationship with the shoulder means to thereby limit the downstream movement of the insert. At least one and preferably two or more of the inserts have longitudinal bores or apertures therethrough communicating with the inlet and outlet means.

The choke also includes a rotatable disc means mounted over the upstream ends of the passages of the flow bean body, with the disc means having an axially extending opening therethrough of a diameter at least as large as the largest bore through the inserts, and adapted to overlay each of the inserts during rotation thereof. Means are also provided for extending into the housing from the outside thereof for rotating the disc means, whereby the axial opening of the disc means may be selectively rotated to alignment with each of the inserts for selectively controlling fluid flow through the choke.

In certain of the embodiments, one of the inserts may be a solid member whereby fluid flow through the choke is shut off when the axial opening of the disc means is aligned therewith. In certain other embodiments of the invention, the inserts having longitudinal bores therethrough are preferably of abrasive resistant material. In addition, annular seal means are preferably provided around each of the inserts for sealing off fluid flow between the inserts and the body.

The choke may also be provided with passageway means communicating with the downstream ends of the longitudinal passages and the outlet means of the housing. The walls forming the passageway means may be of an abrasive resistant material in certain embodiments. In the preferred embodiment, the passageway means includes a generally funnel shaped member (which may be of an abrasive resistant material) mounted in the passageway for deflecting fluid flow toward the center of the outlet means after passage of fluid through the bore of one of the inserts. The aforesaid walls of the passageway and the funnel shaped members may be of abrasive resistant material if an abrasive material is to be flowed therethrough. However, certain installations of the valve herein may be for the purpose of handling non-abrasive fluids, but where an adjustable positive choke is desired.

Reference to the drawings will further explain the invention wherein like numerals refer to like parts and in which:

FIG. 1 is a vertical central sectional view of the presently preferred embodiment of the invention.

FIG. 2 is a cross sectional view generally taken at line 2—2 of FIG. 1.

FIG. 3 is a cross sectional view generally taken at line 3—3 of FIG. 1.

FIG. 4 is another longitudinal sectional view of the choke taken generally at line 4—4 of FIG. 3.

FIG. 5 is a cross sectional view taken generally at line 5—5 of FIG. 1.

FIG. 5–A is a view similar to that shown in FIG. 5, but showing a choke body member having a greater number of passages therethrough than that shown in FIG. 5.

Referring now to the drawings and FIG. 1 in particular, the choke of this invention includes a choke housing generally indicated by the numeral 11 which is of a standard design and widely used in the oil field industry and is comprised of a vertical conduit 12 having a longitudinal opening therethrough in the form of bore 13 which connects with side conduit 14. The upper end of vertical conduit 12, as shown in FIG. 1, is provided with an upstanding externally threaded portion 15 having a bonnet 16 threadably secured over the end thereof with the annular seal 17 therebetween. Bonnet 16 has a central aperture therein in which is threaded selector stem bushing 18 which has passing centrally therethrough selector stem shaft 19. The diameter of that portion of shaft 19 below bonnet 16 is slightly larger in order to provide a shoulder for abutment therewith to retain shaft 19 in housing 11 when pressure is applied thereto. Appropriate sealing means are provided between shaft 19 and the internal bore of bushing 18 in the form of O-ring seals 20.

Vertical conduit 12 is provided with a length of internal threads 26, which mateably engage and support in sealing relationship the external threads of a flow bean body generally indicated by the numeral 27. As best shown in FIG. 4, flow bean body 27 is comprised of an upstream portion 29 threadably secured to a downstream portion 30, the latter of which has external threads 31 thereabout which are adapted to engage with internal threads 26 of conduit 12. Portion 30 is also provided with upper external threads 32 which mate with and engage internal threads of upper portion 29. Upper portion 29 is also provided with an annular recess adjacent to the upper end of threads 32, which recess has supported therein O-ring seal 33, which in combination with threads 32 provide a seal against fluid flow between portions 29 and 30. Further, portions 29 and 30 are held in the locked position by a pair of set screws 34, one of which is shown in FIG. 1, with the other one being spaced on the opposite side of body 27.

Upstream portion 29 has a plurality of longitudinal passages 41 therethrough and generally radially spaced apart in a circular fashion around the central longitudinal axis thereof. Passages 41 are provided with shoulder means in the form of annular shoulders 42 which provide passages 41 with somewhat smaller cross sectional areas toward the lower ends thereof. Passages 41 provide communication between the inlet means of the choke housing 11, in the form of said conduit 14 and the outlet means in the form of bore 13.

Each of the passages 41 has removably mounted therein in abutting relationship with shoulder 42 a fluid flow controlling insert 43, with shoulder 42 restricting or limiting downstream movement of inserts 43 with respect to upstream portion 29.

At least one of the inserts 43, and preferably two or more are provided with a longitudinal bore 44 extending therethrough and communicating with the inlet and outlet means of housing 11. In addition, one of the inserts 43 may be of solid construction for use in closing off fluid flow through the particular passage 41 in which it is inserted as will be described hereinafter. Preferably, inserts 43 are of an abrasive resistant material such as high strength steel, ceramic, carbide or the like, so as to be resistant to the corroding and abrasive effects of the fluid passing therethrough.

Seal means are provided for sealing off fluid flow between inserts 43 and upstream portion 29 which seal means, in one embodiment, include annular O-ring seals 47 mounted in recesses surrounding each of the inserts 43. A rotatable disc means in the form of annular selector disc 48 which is mounted over the upper ends of passages 41 and inserts 43, and is provided with seal means for sealing with upstream portion 29 in the form of O-ring seal 46 mounted in an annular recess extending around disc 48. Seal 46 also assists in sealing off fluid flow around inserts 43.

In an alternate embodiment, seals 47 may be eliminated and the bottom of disc 48 and the tops of inserts 43 can be provided with highly polished, closely fitting mating surfaces such that there is what may be termed metal to metal or lapping seals therebetween. This sealing arrangement, plus seal 46, can in some instances effectively seal off fluid flow around inserts 43.

Disc 48 has a central bolt hole 52 therethrough and is secured to upstream portion 29 by pin 49 pasing therethrough, with the lower end of pin 49 having a threaded portion threaded into a bore hole in the upper end of portion 29. The upper end of pin 49 is also provided with threads and has mounted thereon disc retaining nut 50 and compression washer 51.

Disc 28 is further provided with an axially extending opening 55 which is of a diameter at least as large as the largest bore 44 through inserts 43 and which is adapted to overlay each of the inserts 43 during rotation of disc 48 about pin 49.

When axial opening 55 is rotated to overlay an insert 43 of the solid type having no bore therethrough, or is rotated to overlay a point intermediate two passages 41, then fluid passage through the choke is shut off. When axial opening 55 is rotated to overlay one of the insert bores 44, then fluid communication is completed through the choke and controlled by the cross sectional size of bore 44. Since the diameter of axial opening 55 is preferably at least as large as the largest bore 44, then the greater wear will be on the insert 43 through which fluid communication is maintained. Inserts 43 can be replaced by removal of disc 48 during maintenance of the choke.

The choke also includes means extending into housing 11 from the outside thereof for rotating disc 48 whereby axial opening 55 may be aligned with each of the inserts for selectively controlling fluid flow through the choke. Hence, disc 48 is provided with a pair of prong holes 56, as shown in FIG. 4, which are radially spaced apart from bolt hole 52 and which extend only partially through disc 48 and are adapted to receive the prongs of selector stem prong 58 which is threadably connected to selector stem shaft 19 and held against rotation by cotter pin 59.

As previously explained, shaft 19 extends upwardly through bushing 18 and is provided with shoulder means for abutting against the bottom of bushing 18, as explained above. The upper end of shaft 19 has connected thereto transversely extending handle 61, which is connected to shaft 19 by handle bolt 62.

Handle 61 has indexing means associated therewith in the form of thumb screw 63 passing downwardly therethrough, with the pointed lower end thereof adapted to be received in one of a plurality of circumferential openings (designated by the letters A, B, C and D) provided in indicator plate 64, which plate is held in position against a portion of bushing 18 by means of retaining nut 65 and lock washer 66. By coordinating the alignment of disc 48 and indicator plate 64, then the position of axial opening 55 in disc 48 can be read by reference to the location of thumb screw 63 with respect to indicator plate 64. Moreover, this arrangement of the indexing means prevents the disc 48 from being unexpectedly rotated to a different position. In other words, disc 48 can only be rotated by removing thumb screw 63 and turning on handle 61 to the new or desired position. Moreover, inserts 43 may be arranged such that the one with the smallest bore 44 therethrough is aligned with opening 55 of disc 48 in the A position, and an insert 43 with a larger bore 44 therethrough in the B position, and the like.

In the preferred embodiment, body 27 is provided with passageway means communicating with the downstream ends of passages 41 and with the outlet means. The walls forming the passageway means may be of an abrasive resistant material. This passageway means conveniently takes the form of flow alignment funnel 68, which may be of an abrasive resistant material. The lower end of funnel 68 is pressed against O-ring seal 65 mounted on annular shoulder 70 provided in the generally funnel shaped bore 71 of downstream portion 30. Funnel 68 is for the purpose of deflecting fluid flow toward the center of the outlet means, thereby reducing the abrasive effect caused by the increased velocity of the fluid as it passes through the restricted bore 44 of the particular insert 43 through which fluid flow is maintained. It is to be understood that funnel 68 could be made integral with downstream portion 30. However, by being separate, it can be replaced more readily in case of wear.

To install body 27 in housing 11 (and/or to change or check the condition of inserts 43) bonnet 16 and associated elements are removed from threaded portion 15 of housing 11. Body 27 is then placed in position and made up with lower external threads 31 engaging internal threads 26 of conduit 12, it being understood that body 27 will be initially assembled in the condition shown prior to insertion in housing 11. The upstream portion 29 of body 27 is provided with a plural sided portion for engagement of wrench means or the like. The choke can then be reassembled making sure that the prongs of selector stem prong 58 engage holes 56 of disc 48. Disc retaining nut 50 will have been previously tightened up against compression washer 51 and disc 48 such that there is a snug fit of disc 48 against O-ring seals 47, yet disc 48 will be free enough to permit rotation thereof by hand.

As best shown in FIG. 1, the upper end of body 27 is also provided with stop lug 72, which is adapted to contact and prevent further rotation of index pin 73 mounted in the peripheral edge of disc 48. With selector stem prong 58 engaging prong holes 56 of disc 48, handle 61 is rotated until pin 73 contacts stop lug 72, which might be the initial position of disc 48, for example. Indicator plate 64 may then be rotated to the desired position, as for example, it may be rotated to assist the openings designated by the letters A, B, C, and D with the desired inserts 43 as explained above. With plate 64 held in this position, nut 65 is tightened with indicator plate 64 then being properly oriented. Longitudinal passages 41 may be lettered A through D and notched with similar letters shown on plate 64 to facilitate assembly and orientation of the valve. The choke may be closed by rotating disc 48 such that opening 55 therethrough is intermediate two of passages 41, and hence, handle 61 would be intermediate two of the letters shown on plate 64.

It is to be understood that the bores 44 of inserts 43 may be either of the same size or of different sizes. For example, if it is desirable to have a choke with a plurality of different sized orifices so that the rate of fluid flow can be readily changed, then bores 44 would be selected to span a size range sufficient to cover the desired range of fluid flows. If a particularly corrosive or abrasive fluid is being flowed through the choke and it is desirable to maintain only one choke size, but to insure that the choke size does not change because of abrasion, then bores 44 can be of the same size, whereby fluid flow can be changed to different bores if there is any indication of abrasion of the orifice after a period of usage, merely by rotating disc 48.

It is to be understood that the number of longitudinal passages 41 through upstream portion 29 may vary from as few as two up to several, depending upon the size of the choke and the size of the passages. For example, FIG. 5-A shows a flow bean body with six passages 41 therethrough, each of which has an insert 43 mounted therein. One of the inserts may be solid to shut off flow through the choke when opening 55 of disc 48 is aligned therethrough and the balance of the inserts may have bores 44 of different cross sectional areas.

There are many advantages of the present invention. This choke permits the changing of choke size, i.e. flow rate, in a matter of seconds. It is much safer than many prior art chokes because it does not require bleeding pressure off or disassembling the choke body in order to change choke sizes. It is economical because of simple construction and because the portions which are subjected to greatest wear are inexpensive and easily replaced. The choke is adaptable to presently existing choke housing being used in the field.

Moreover, it provides the advantages of the adjustable chokes, plus the added advantage of controlling flow through a fixed size orifice.

The direction of the fluid flow through funnel 68 permits re-alignment of the fluid flow to prevent abrasion which would normally be caused by the increased velocity occasioned by the nozzle effect of the choke. The indexing means of the apparatus is easily installed to provide the operator with an indication of the size of the orifice through which flow is being made.

What is claimed is:

1. An adjustable positive choke for controlling fluid flow therethrough comprising:

a housing having a longitudinally extending opening therethrough, said housing including inlet and outlet means leading to and from said opening;

a flow bean body fixedly mounted in fluid-flow blocking relationship in said opening, said body comprising an upstream portion having a plurality of radially spaced apart longitudinal passages therethrough with each of said passages being provided with a shoulder means, and said body having a downstream portion having a longitudinal funnel shaped passageway communicating with the downstream ends of said longitudinal passages and said outlet means of said housing for deflecting fluid flow toward the center of said outlet means;

a fluid flow controlling insert mounted in each of said passages in abutting relationship with said shoulder means to limit downstream movement thereof with at least one of said inserts having a longitudinal bore therethrough for passage of fluid therethrough from said inlet means to said funnel shaped passageway;

seal means for sealing off fluid flow between said inserts and said upstream member;

a rotatable disc means mounted over the upstream ends of said inserts, said disc means having an axially extending opening therethrough of a diameter at least as large as the largest bore through said inserts, said axial opening being adapted to overlay each of said inserts during rotation of said disc;

and, means extending into said housing from the outside thereof for selectively rotating said disc means, whereby said axial opening thereof may be rotated to alignment with each of said inserts for selectively controlling fluid flow through said choke.

2. The choke as claimed in claim 1 including:

indexing means associated with said disc means and said means extending to said housing, for selectively aligning said axial opening of said disc means over each of said inserts.

3. The choke as claimed in claim 2 wherein:

said downstream portion of said body is provided with external threads for engaging matching threads provided in said housing;

and including seal means cooperative with said external threads for controlling fluid flow between said upstream and downstream portions.

4. The choke as claimed in claim 1 wherein:

at least two of said inserts have axial bores therethrough of different cross-sectional areas.

5. The choke as claimed in claim 1 wherein:

said seal means includes an annular seal between said disc means and said upstream portion of said flow bean body.

6. The choke as claimed in claim 1 wherein:

the walls of said funnel shaped passageway are formed by a funnel shaped member removably mounted in said downstream portion of said body.

7. The invention as claimed in claim 6 wherein:

said funnel shaped member is of an abrasive resistant material.

8. An adjustable positive choke for controlling fluid flow therethrough, comprising:

a housing having a longitudinally extending opening therethrough, said housing including an inlet and outlet leading to and from said opening;

a flow bean body fixedly mounted in fluid-flow blocking relationship in said opening and having a plurality of longitudinal passages therethrough with each of said passages communicating with said inlet and outlet and each of said passages having a shoulder therein;

a fluid flow controlling insert removably mounted in each of said passages in abutting relationship with the adjacent shoulder to limit downstream movement of said insert, with a plurality of said inserts each having a longitudinal bore therethrough communicating with said inlet and outlet, and with each of the inserts that is provided with a bore therethrough being of an abrasive resistant material;

annular seal means around each of said inserts for sealing off fluid flow between said inserts and said body;

a rotatable disc mounted over the upstream ends of said inserts, said disc having a single axially extending opening therethrough adapted to overlay each of said inserts during rotation thereof, said axially extending opening being arranged for overlying only one of said bores at any one time;

and, means extending into said housing from the outside thereof for rotating said disc, whereby said axial opening of said disc may be selectively rotated to alignment over each of said inserts to thereby selectively control fluid flow through said choke.

9. The choke as claimed in claim 8 wherein:
said axially extending opening through said disc means is of a diameter which is smaller than the diameter of said inserts and at least as large as the diameter of the largest bore through said inserts.

10. The invention as claimed in claim 8 wherein:
said body is provided with a passageway communicating wih the downstream ends of said longitudinal passages and said outlet of said housing, with the walls forming said passageway being of an abrasive resistant material.

11. An adjustable positive choke for controlling fluid flow therethrough, comprising:

a housing having a longitudinally extending opening therethrough, said housing including an inlet and outlet leading to and from said opening;

a flow bean body fixedly mounted in fluid-flow blocking relationship in said opening and having a plurality of longitudinal passages therethrough with each of said passages communicating with said inlet and outlet and each of said passages having a shoulder therein, said flow bean body being provided with an upstream portion having said longitudinal flow passages, and a downstream portion having a longitudinal passageway communicating with the downstream ends of said longitudinal passages and said outlet means of said housing, and a funnel shaped member mounted in said downstream passageway for deflecting fluid flow toward the center of said outlet means after passage of fluid through the bore of one of said inserts;

a fluid flow controlling insert removably mounted in each of said passages in abutting relationship with the adjacent shoulder to limit downstream movement of said insert, with a plurality of said inserts each having a longitudinal bore therethrough communicating with said inlet and outlet, and with each of the inserts that is provided with a bore therethrough being of an abrasive resistant material;

a rotatable disc mounted over the upstream ends of said inserts, said disc having a single axially extending opening therethrough adapted to overlay each of said inserts during rotation thereof, said axially extending opening being arranged for overlaying only one of said bores at any one time;

and, means extending into said housing from the outside thereof for rotating said disc, whereby said axial opening of said disc may be selectively rotated to alignment over each of said inserts to thereby selectively control fluid flow through said choke.

References Cited

UNITED STATES PATENTS

| | | | |
|---|---|---|---|
| 3,207,181 | 9/1965 | Willis | 137—625.31 X |
| 3,256,909 | 6/1966 | Obidniak et al. | 137—625.31 |
| 2,219,504 | 10/1940 | Willis | 137—329 |
| 3,067,768 | 12/1962 | Burg | 251—205 X |

ARNOLD ROSENTHAL, Primary Examiner

U.S. Cl. X.R.
251—208, 368